United States Patent [19]

Ishida et al.

[11] Patent Number: 5,651,553
[45] Date of Patent: Jul. 29, 1997

[54] ANTIROTATION STRUCTURE FOR COMBINED OIL RING

[75] Inventors: Masao Ishida, Suwa; Yoshio Naruse, Okaya, both of Japan

[73] Assignee: Teikoku Piston Ring Co., Ltd., Tokyo, Japan

[21] Appl. No.: 634,265

[22] Filed: Apr. 18, 1996

[30] Foreign Application Priority Data

Apr. 25, 1995 [JP] Japan .................................. 7-124262
Dec. 19, 1995 [JP] Japan .................................. 7-348871

[51] Int. Cl.$^6$ ...................................................... F16J 9/06
[52] U.S. Cl. ........................... 277/136; 277/138; 277/137; 277/163
[58] Field of Search ........................... 277/136, 138, 277/137, 163

[56] References Cited

U.S. PATENT DOCUMENTS

| | | | |
|---|---|---|---|
| 1,791,280 | 2/1931 | Moorhouse | 277/136 |
| 3,105,695 | 10/1963 | Burns et al. | 277/136 |
| 3,108,817 | 10/1963 | Huges | 277/136 |
| 3,955,823 | 5/1976 | Willem | 277/163 |

FOREIGN PATENT DOCUMENTS

| | | |
|---|---|---|
| 5731546 | of 1980 | Japan . |
| 56-165937 | 5/1980 | Japan . |
| 57-31546 | 7/1980 | Japan . |
| 56-9879 | 3/1981 | Japan . |
| 0332156 | of 1991 | Japan . |
| 3-32156 | 3/1991 | Japan . |
| 5-25064 | 4/1993 | Japan . |
| 6-59660 | 8/1994 | Japan . |

OTHER PUBLICATIONS

Japanese Industrial Standard, General Rules for Piston Rings, JIS B 8032 dated 1993.

*Primary Examiner*—William A. Cuchlinski, Jr.
*Assistant Examiner*—Christina Annick
*Attorney, Agent, or Firm*—Armstrong, Westerman, Hattori, McLeland & Naughton

[57] ABSTRACT

A combined oil ring comprises an oil ring and a coil expander. A curved bar passes through paired end portions of the coil expander. An antirotation member comprises a portion to be inserted into a hole and a portion to be held. Two mutually parallel surfaces of the portion to be held are held between paired end surfaces of the coil expander while the portion to be inserted into a hole is inserted into an antirotation member securing hole formed at the bottom surface of an oil ring groove of a piston. The curved bar passes through a curved bar insertion hole formed in the portion of the antirotation member to be held.

8 Claims, 4 Drawing Sheets

ANTIROTATION STRUCTURE FOR COMBINED OIL RING

BACKGROUND OF THE INVENTION

1. Field of the Invention

This invention relates to an antirotation structure for a combined oil ring for internal combustion engines.

2. Description of the Related Art

The internal cylindrical surface of the two-cycle engine cylinder has port openings. If a piston ring rotates in its circumferential direction and as a result the ring gap comes to the port opening position, the pair of end portions of the ring expand outward by its expanding force. If the ring moves up and down under that state, the end portions may be caught by the port opening edge.

In an engine with cylinder axis tilted to horizontal or almost horizontal position, if the ring rotates so that the ring gap comes to the lower position, lubricant oil may find its way through the gap into the combustion chamber while the engine is at rest. If the engine is started under that state, white smoke may be produced or consumption of lubricant oil may increase.

Since the above problems are caused by rotation of the ring in its circumferential direction, in some cases antirotation measures are taken for the ring.

Situations for employing the antirotation structure for the ring in various engines are as follows.

Diesel engines for construction equipment and marine applications with fewer number of starts and stops usually do not employ the antirotation structure for the ring.

Of the automobile gasoline engines frequently started and stopped, those with the cylinder axis tilted to horizontal or almost horizontal position usually employ the antirotation structure for the ring.

Conventionally, diesel engines with cylinder axis tilted to horizontal or almost horizontal position have been little employed in cars. Therefore those engines have not employed the antirotation structure for the ring. Recently, however, such diesel engines tend to be employed in cars.

Specific types of the antirotation structure for a compression ring employ generally, 1. Joint with internal notch.
2. Joint with side notch.

(Refer to JIS B 8032).

Antirotation structures for the 3-piece combined oil ring consisting of two side rails and a spacer expander are disclosed for instance in the following utility models.

1. Utility Model Laid-open No. Sho 56-165937
2. Utility Model Laid-open No. Hei 6-59660
3. Utility Model Publication No. Sho 56-9879
4. Utility Model Laid-open No. Hei 5-25064
5. Utility Model Laid-open No. Hei 3-32156.

An antirotation structure for the 2-piece combined oil ring consisting of an oil ring and a coil expander is disclosed in the following utility model.

1. Utility Model Laid-open No. Sho 57-31546.

Utility Model Laid-open No. Sho 56-165937 discloses an antirotation means in which the end portion of a side rail is bent in the axial direction and the bent portion is fit into a recess formed on the upper or lower surface of an oil ring groove to produce the antirotation effect. However, since the recess is formed on the upper or lower surface of an oil ring groove, a problem arises that the sealing effect between the side rail and the upper or lower surface of the oil ring groove lowers at the recess.

Utility Model Laid-open No.Hei 6-59660 discloses an antirotation means employing a dowel pin located in the radial direction on the upper or lower surface of an oil ring groove, with the pin partially exposed. However, this arrangement also has a problem, since the arcuate surface of the dowel pin is exposed from the upper or lower surface of the oil ring groove, the sealing effect between a side rail and the upper or lower surface of the oil ring groove becomes incomplete around the dowel pin. Another problem is that, since notches are formed on the internal surface in the end portions of the side rail, strength in that portion is poor in case of the reduced thickness in the radial direction of the side rail.

Utility Model Publication No. Sho 56-9879 and Utility Model Laid-open No.Hei 5-25064 describe antirotation means in which a spacer expander engages with a dowel pin, and the end portions of a side rail are bent in the axial direction so as to engage with the spacer expander. Utility Model Laid-open No. Hei 3-32156 describes antirotation means in which part of a spacer expander is bent inward so as to engage with a recess on the bottom surface of an oil ring groove, and the end portions of a side rail are bent in the axial direction so as to engage with the spacer expander. However, each of them has a problem that, when the side rail is treated by nitriding, the bending strength is reduced after the treatment and there is a possibility of breaking when it is bent.

Utility Model Laid-open No. Sho 57-31546 describes antirotation means in which portions of a coil wire at both ends of a coil expander are projected radially inwardly and outwardly, and the projected portions are respectively fit into the oil hole of an oil ring and into the oil drain hole of a piston. Incidentally, usually the outside circumferential surface of the coil expander is processed with centerless grinding in order to reduce pressure on the contact surface between the coil expander and the oil ring. However, the above structure makes the grinding process on the outside circumferential surface of the coil expander difficult because the portions of the coil wire at the ends of the coil expander are directed in the radial direction and projected from the outside circumferential surface of the coil expander. Another problem with the above structure is that since the end surfaces of the coil expander cannot be ground, stability at the joint end portion is poor. Still another problem with such a structure is that, since the overall length of the coil expander can not be changed after forming the coil expander, adjustment of expansion force cannot be made.

SUMMARY OF THE INVENTION

An object of the present invention is to provide an antirotation structure for the combined oil ring without sacrificing the sealing effect on the upper and lower surfaces of the oil ring groove. Another object of the present invention is to provide an antirotation structure for the combined oil ring which can be subjected to nitriding. Another object of the present invention is to provide an antirotation structure for the combined oil ring capable of employing an ordinary coil expander. Still another object of the present invention is to provide an antirotation structure for the combined oil ring without forming notches for antirotation at the ends of the oil ring.

From past experience, it is known that there is no relative rotation between the coil expander and the oil ring during operation of an engine. Therefore, if the coil expander is prevented from rotating relative to the piston, the oil ring is also prevented from rotating relative to the piston.

The antirotation structure for the combined oil ring of the present invention is to be applied to a combined oil ring comprising an oil ring of a generally I-shaped cross section formed by paired upper and lower rails extending along a circumferential direction and connected together by a web portion, and a coil expander fit along the inside circumferential surface of the oil ring for forcing the oil ring radially outward, and is characterized in that an antirotation member is held between paired end surfaces of the coil expander and that the radially inward end of the antirotation member is inserted into a hole formed at the bottom of the oil ring groove on a piston.

Preferably the antirotation member has two surfaces parallel to each other and these two surfaces are supported in a position between the pair of end surfaces of the coil expander.

When the curved bar is placed across the pair of ends of the coil expander, the antirotation member is provided with a hole or a slot through which the curved bar passes.

The hole for receiving the radially inward end of the antirotation member may be the oil drain hole provided at the bottom of the oil ring groove on the piston or another hole specially provided at the bottom of the oil ring groove besides the oil drain hole.

As described above, since the radially inward end of the antirotation member is inserted into the hole provided on the bottom of the oil ring groove, the antirotation member is held at the intended position along the circumferential direction of the oil ring groove. Since the paired end surfaces of the coil expander support the antirotation member, the coil expander is prevented from rotating in the circumferential direction. Thus, the oil ring which is forced in the radial direction by the coil expander is also prevented from rotating.

Alternatively, the projection may be formed at the radially outward end of the antirotation member and inserted into the oil hole formed in the oil ring so that rotation of the oil ring is prevented directly by the antirotation member.

BRIEF DESCRIPTION OF THE DRAWINGS

The aforesaid and other objects and features of the present invention will become more apparent from the following detailed description and the accompanying drawings.

FIG. 1a is a plan view partially in cross section. FIG. 1b is a vertical cross-sectional view. FIG. 2a is a plan view partially in cross section. FIG. 2b is a vertical cross-sectional view. FIG. 4a is a plan view partially in cross section. FIG. 4b is a vertical cross-sectional view. FIG. 4c is a front view.

DESCRIPTION OF THE PREFERRED EMBODIMENTS

Figure 1A:
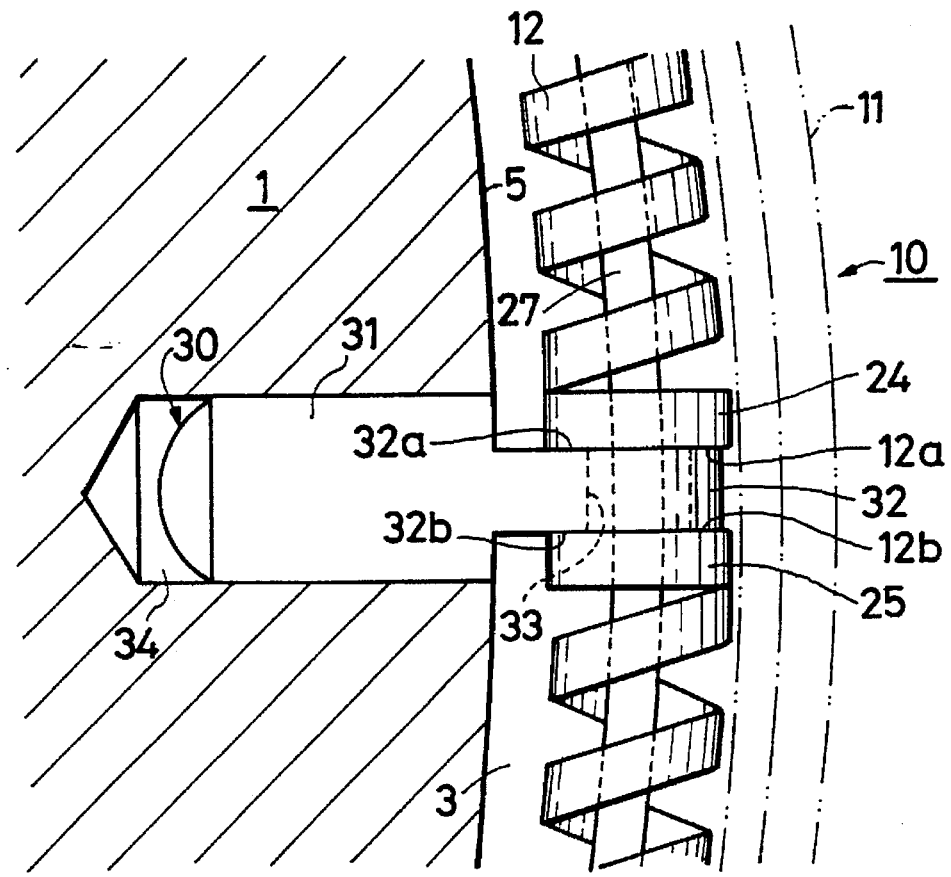
FIG. 1a and FIG. 1b show an antirotation structure for a two piece combined oil ring according to an embodiment of the present invention.
Figure 1B:
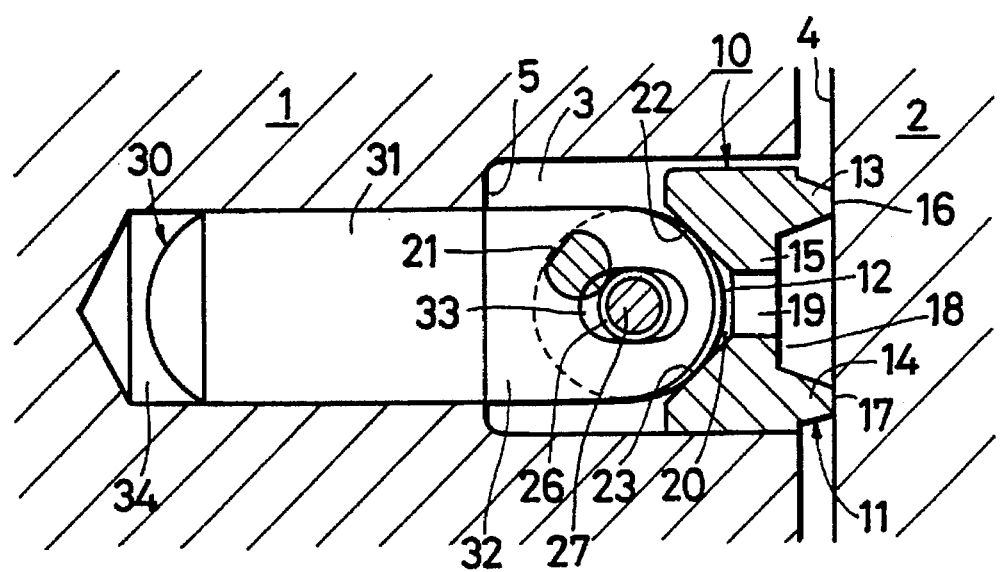
Figure 3A:
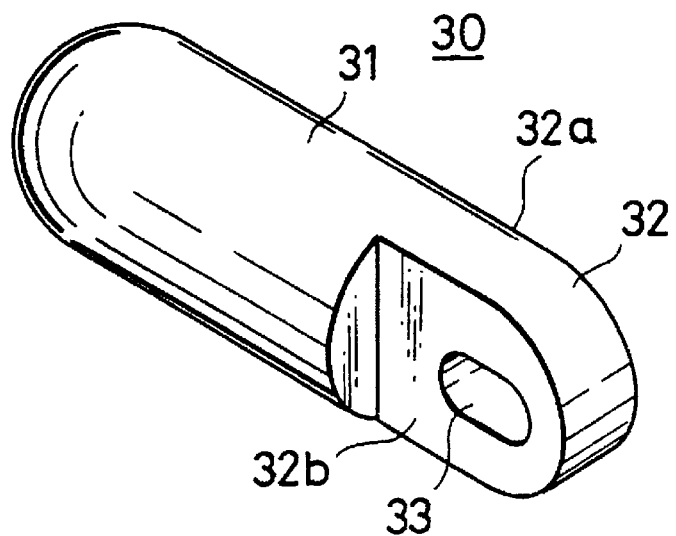
FIG. 3a through FIG. 3c are perspective views of different antirotation members.

Referring to FIG. 1a, FIG. 1b, and FIG. 3a, a preferred embodiment of an antirotation structure for a two piece type combined oil ring according to the present invention will be described below.

A piston 1 shown in the drawings is for use in a horizontal type engine with a cylinder 2 arranged horizontally. A combined oil ring 10 is provided in an oil ring groove 3 formed on the outside surface of a piston 1 arranged in the cylinder 2. The combined oil ring 10 is of a two piece type made of steel, and comprises an oil ring 11 and a coil expander 12.

The oil ring 11 is a steel ring formed in a generally I-shape in cross section, and comprises paired upper and lower rails 13, 14 extending in the circumferential direction and joined together by a thin-walled, straight web portion 15. The outside circumferential surfaces 16, 17 of the upper and lower rails 13, 14 are in contact with the inside cylindrical surface 4 of the cylinder 2 and constitute sliding surfaces to scrape oil on the inside cylindrical surface 4 of the cylinder 2. An outside circumferential groove 18 formed by the web portion 15 and the outside circumferential projections of the upper and lower rails 13, 14 is an oil receiving groove. The oil on the inside cylindrical surface 4 of the cylinder 2 is scraped by the outside circumferential surfaces 16, 17 of the upper and lower rails 13, 14, and moves through a plurality of oil holes 19 formed on the web portion 15 at equal intervals along its circumferential direction to the inside circumferential side of the oil ring 11, and further through a plurality of oil drain holes formed on the bottom surface 5 of the oil ring groove 3 on the piston 1 down into the oil pan.

The coil expander 12 fits in an inside circumferential groove 20 formed by the inside circumferential projections of the upper and lower rails 13, 14 and the web portion 15, and forces the oil ring 11 in the radially outward direction. The coil expander 12 is made of a wire of a circular cross section wound into a coil, the outside cylindrical surface of the coil is then ground, and the coil is formed into a ring. Therefore, the cross section of the wire is a circle with its outside circumferential portion cut off by grinding. The ground surface 21 is brought into contact with sloped surfaces 22, 23 of the inside circumferential projections forming the inside circumferential groove 20 of the oil ring 11. End surfaces 12a, 12b of paired ends 24, 25 of the coil expander 12 are formed parallel to each other and flat and parallel to the axial direction. A curved bar 27 is inserted into a circumferentially directed space 26 in the coil expander 12 across the paired ends 24, 25 of the coil expander 12. Here, the cross-sectional shape of the wire which forms the coil expander is not limited to the one described above but may be circular or rectangular.

Next, referring to FIG. 3a, an antirotation member 30 will be described. The antirotation member 30 is a generally pin component, comprising a round bar portion 31 to be inserted into a hole, and a plate portion 32 protruding from one end surface of the round bar portion 31, to be held by the coil expander 12. The antirotation member 30 is formed by cutting the opposite sides of one end of the round bar by equal amounts. Opposing two surfaces 32a, 32b of the plate portion 32 are parallel to each other. The plate portion 32 has a through hole 33 running in the direction of thickness for inserting the curved bar 27. The cross section of the through hole 33 for inserting the curved bar 27 is elongate in the direction of the projection with a dimension approximately the same as that of the cross section of the circumferentially directed space 26 in the coil expander 12, and is rounded at both ends.

A blind hole 34, separate from the oil drain hole, is formed for fixing the antirotation member 30 in the radial direction of the piston 1 at the bottom surface 5 of the oil ring groove 3 on the piston 1. The outside diameter of the round bar portion 31 of the antirotation member 30 is slightly greater than the inside diameter of the blind hole 34. The round bar portion 31 of the antirotation member 30 is press fit into the blind hole 34 so that the plate portion 32 of the antirotation member 30 projects from the bottom surface 5 of the oil ring groove 3 in the radial direction of the piston 1 with the two parallel surfaces 32a, 32b facing in the circumferential direction.

The coil expander 12 is provided in the oil ring groove 3 of the piston 1 in a compressed state with its paired end surfaces 12a, 12b abutting the two parallel surfaces 32a, 32b of the plate portion 32 to exert an expanding force in the radially outward direction. The curved bar 27 is inserted through the circumferentially directed space 26 in the coil expander 12 across the paired ends 24, 25 and also through the through hole 33 formed in the plate portion 32 of the antirotation member 30.

The oil ring 11 is forced radially outwardly by the coil expander 12 so that the outside circumferential surfaces 16, 17 of the upper and lower rails 13, 14 are brought into pressing contact with the inside cylindrical surface 4 of the cylinder 2.

As described above, since the antirotation member 30 is secured in the oil ring groove 3 and the coil expander 12 holds the antirotation member 30 from both sides, the coil expander 12 is prevented from rotating in the circumferential direction. As a result, the oil ring 11 which is forced by the coil expander 12 is also prevented from rotating in the circumferential direction.

In the above embodiment, while the inside diameter of the blind hole 34 for fixing the antirotation member 30 is made slightly smaller than the outside diameter of the round bar portion 31 of the antirotation member 30, the dimensional relationship should not be limited to the above. The inside diameter of a hole formed on the bottom surface 5 of the oil ring groove 3 of the piston 1 may be greater than the outside diameter of the round bar portion 31 of the antirotation member 30. As a matter of course, both dimensions may be the same.

Figure 2A:
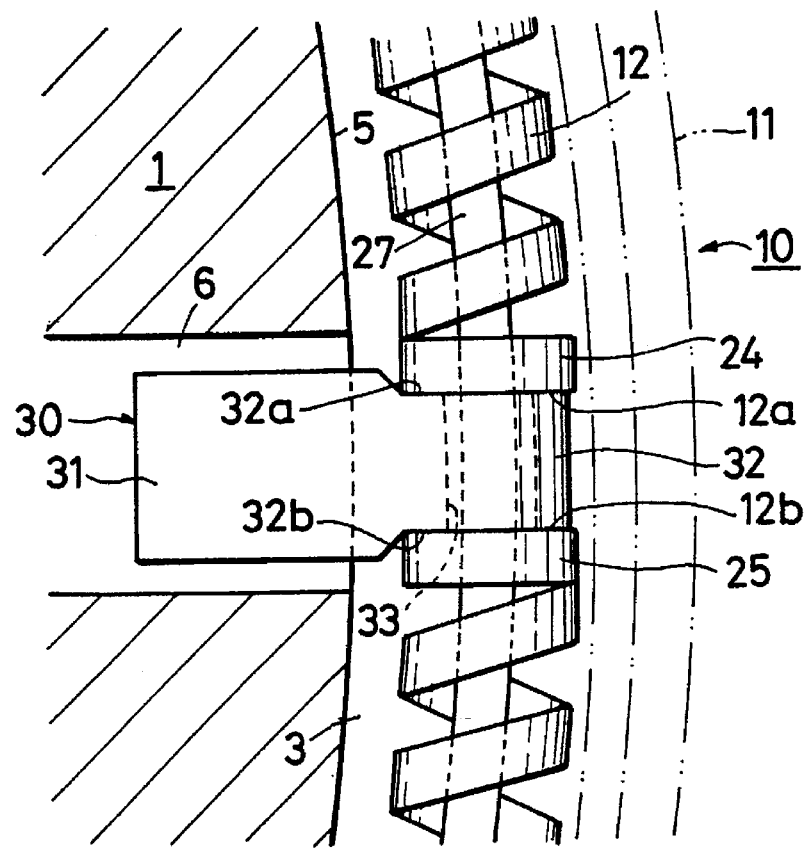
FIG. 2a and FIG. 2b show an antirotation structure for a two piece combined oil ring according to another embodiment of the present invention.
Figure 2B:
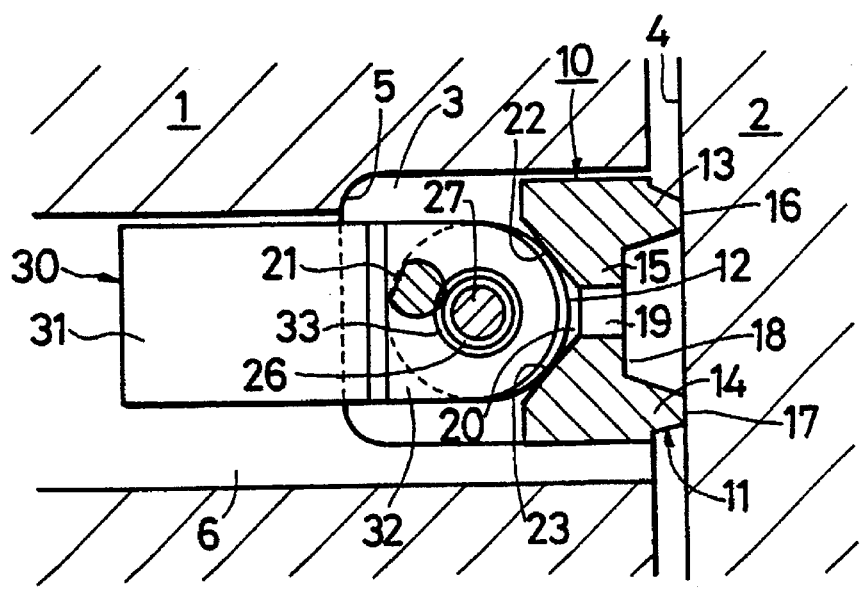

FIG. 2a and FIG. 2b show another embodiment of an antirotation structure for a two piece type combined oil ring according to the present invention. This embodiment is different from the above embodiment regarding the hole formed in the piston into which the round bar portion 31 of the antirotation member 30 is inserted. In this embodiment, an oil drain hole 6 formed at the bottom surface 5 of the oil ring groove 3 of the piston 1 is used for inserting the round bar portion 31 of the antirotation member 30. In other words, the round bar portion 31 of the antirotation member 30 with its plate portion 32 supported between the paired end surfaces 12a and 12b of the coil expander 12 is inserted into the oil drain hole 6 of the piston 1. In this embodiment, while the through hole 33 for inserting the curved bar 27, formed on the plate portion 32 of the antirotation member 30 is made circular with an inside diameter slightly greater than that of the circumferentially directed space 26 in the coil expander 12, the hole may be of an elongate cross section as in the above embodiment as a matter of course.

Since the inside diameter of the oil drain hole 6 is greater than the outside diameter of the round bar portion 31 of the antirotation member 30, although the round bar portion 31 of the antirotation member 30 is not fixed in the drain hole 6, the round bar portion 31 is prevented by the inside cylindrical wall of the oil drain hole 6 from moving in the circumferential direction of the oil ring groove, thus preventing the coil expander 12 from rotating in the circumferential direction. As a result, the oil ring 11 is also prevented from rotating in the circumferential direction.

Figure 3B:
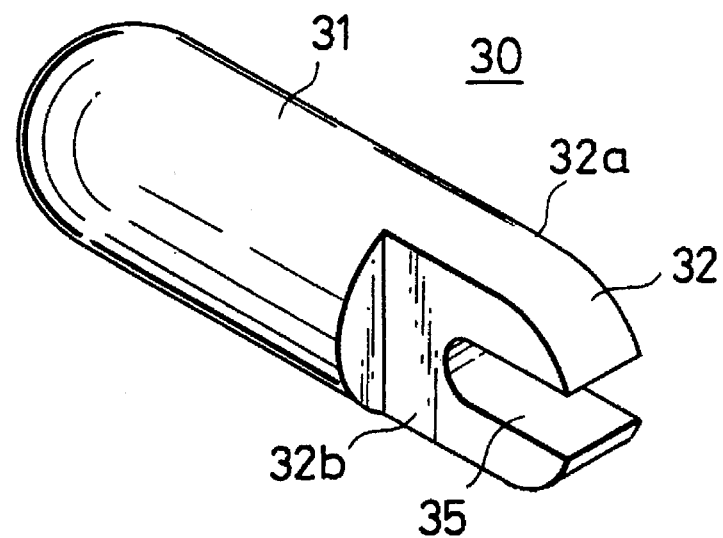

While the above two embodiments show the curved bar insertion hole formed in the plate portion of the antirotation member, the hole may be replaced, as shown in FIG. 3b, with a straight slot 35 extending from end surface in the projecting direction of the plate portion 32 and having a width slightly greater than the outside diameter of the curved bar 27 so that the curved bar 27 is inserted through the slot 35.

While the portion of the antirotation member to be inserted into a hole is made in the shape of a round bar in the above two embodiments, the shape of the antirotation member is not limited to the one shown in the above two embodiments. For instance, the portion to be inserted into a hole and the portion to be held by the coil expander may be made into a single plate shape.

Figure 3C:
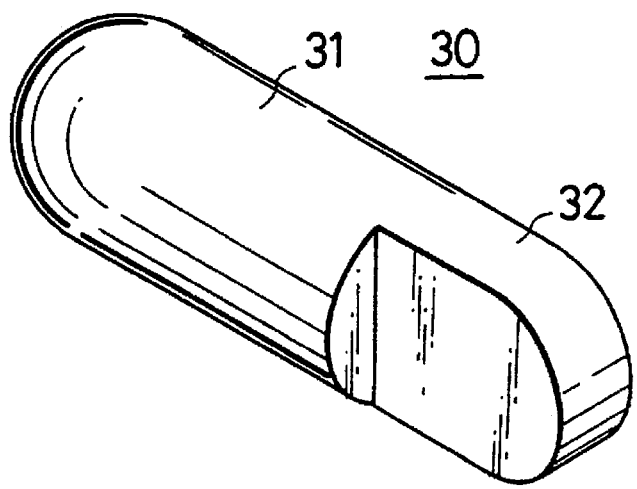

While the above two embodiments show the antirotation structure using the curved bar 27 inserted in the coil expander 12, in the case that the curved bar is not used, as shown in FIG. 3c, the plate portion 32 of the antirotation member 30 may not be provided with the hole or the slot for inserting the curved bar.

Figure 4A:
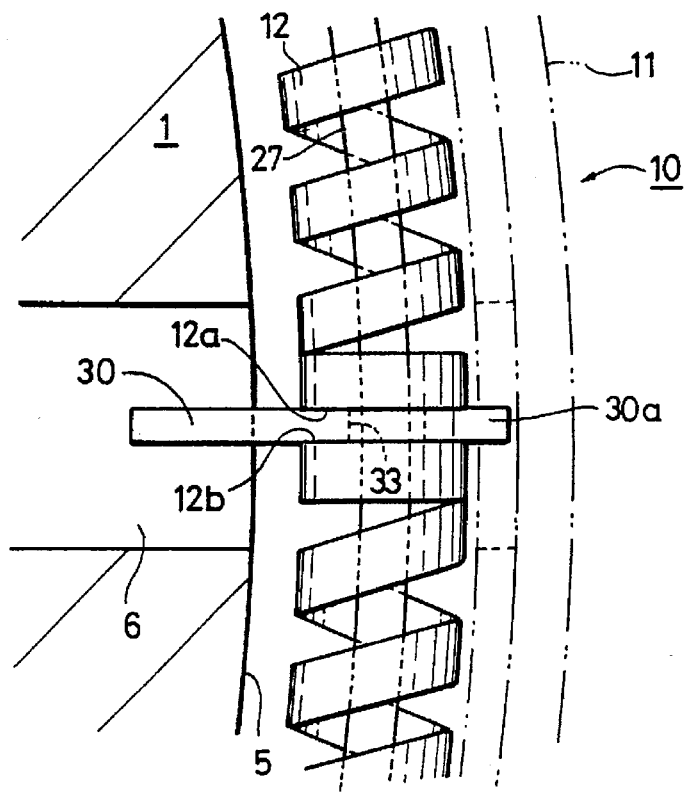
FIG. 4a through FIG. 4c show an antirotation structure for a two piece combined oil ring according to still another embodiment of the present invention.
Figure 4B:
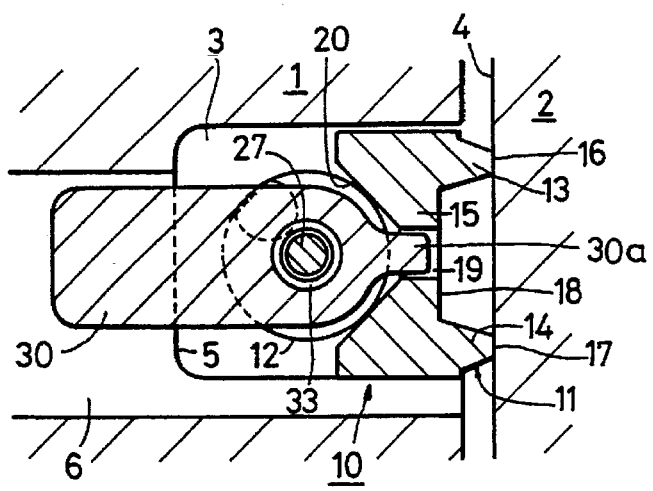
Figure 4C:
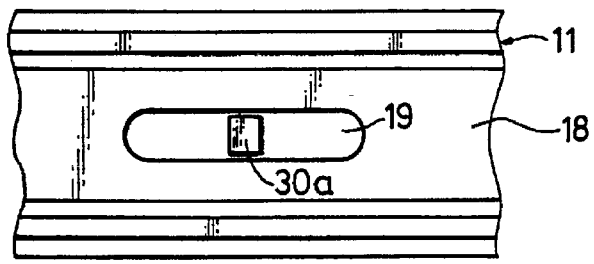

FIG. 4a through FIG. 4c show still another embodiment of the present invention. In this embodiment, the antirotation member 30 is made of a single plate and further provided with a projection 30a at the radially outward end. In other words, the antirotation member 30 is held between the paired end surfaces 12a, 12b of the coil expander 12 and the curved bar 27 is inserted through the hole 33 formed on the antirotation member 30. The antirotation member 30 is a plate member of an oblong rectangular shape in the radial direction as seen in the circumferential direction of the piston 1, with its axial dimension slightly less than the cross-sectional outside diameter of the coil expander 12. The antirotation member 30 is provided at the radially outward end, with the projection 30a projecting radially outward from the axial midpoint. The projection 30a is inserted into an oil hole 19 formed in the web portion 15 of the oil ring 11 and having a cross section oblong in the circumferential direction. The radially inward end of the antirotation member 30 is inserted into the oil drain hole 6 formed on the bottom surface 5 of the oil ring groove 3.

Thus, the projection 30a on one end of the antirotation member 30 placed between the paired end surfaces 12a, 12b of the coil expander 12 is inserted into the oil hole 19 in the oil ring 11 so that the projection 30a engages with the circumferential end surfaces of the oil hole 19.

Therefore, the combined oil ring 10 is prevented from rotating in the circumferential direction as the circumferential end surfaces of the oil hole 19 engage with the projection 30a of the antirotation member 30.

Although the present invention has been described with reference to the preferred embodiments, it is apparent that the present invention is not limited to the aforesaid preferred embodiments, but various modification can be attained without departing from its scope.

What is claimed is:

1. An antirotation structure for preventing a combined oil ring from rotating in the circumferential direction within an oil ring groove of piston, said combined oil ring comprising, an oil ring of generally I-shaped cross section by formed paired upper and lower rails extending in a circumferential direction and joined together by a web portion, and a coil expander placed on the inside surface side of said oil ring so as to force said oil ring in the radially outward direction, wherein an antirotation member is held between paired end surfaces of said coil expander, and a radially inward end of said antirotation member is inserted into a hole formed at a bottom of said oil ring groove of said piston, wherein a projection is formed at a radially outward end of said antirotation member and said projection is inserted into an oil hole formed in said oil ring.

2. The antirotation structure for a combined oil ring as claimed in claim 1, wherein said antirotation member has two mutually parallel surfaces which are held between said paired end surfaces of said coil expander.

3. The antirotation structure for a combined oil ring as claimed in claim 1, wherein said antirotation member has a hole or a slot, and a curved bar placed in said coil expander across paired ends of said coil expander passes through said hole or slot formed in said antirotation member.

4. The antirotation structure for a combined oil ring as claimed in any one of claims 1, 2 and 3, wherein said hole at said bottom of said oil ring groove is an oil drain hole.

5. The antirotation structure for a combined oil ring as claimed in any one of claims 1, 2 and 3, wherein said hole at said bottom of said oil ring groove is a hole formed separately from an oil drain hole.

6. The antirotation structure for a combined oil ring as claimed in claim 2, wherein said antirotation member has a hole or a slot, and a curved bar placed in said coil expander across paired ends of said coil expander passes through said hole or slot formed in said antirotation member.

7. The antirotation structure for a combined oil ring as claimed in claim 6, wherein said hole at said bottom of said oil ring groove is an oil drain hole.

8. The antirotation structure for a combined oil ring as claimed in claim 6, wherein said hole at said bottom of said oil ring groove is a hole formed separately from an oil drain hole.

* * * * *